United States Patent
Gerber, Jr. et al.

(10) Patent No.: US 12,026,182 B2
(45) Date of Patent: Jul. 2, 2024

(54) AUTOMATED PROCESSING OF UNSTRUCTURED TEXT DATA IN PAIRED DATA FIELDS OF A DOCUMENT

(71) Applicant: RSA Security LLC, Bedford, MA (US)

(72) Inventors: Gregory A. Gerber, Jr., Colorado Springs, CO (US); Sashka T. Davis, Vienna, VA (US)

(73) Assignee: Archer Technologies LLC, Overland Park, KS (US)

( * ) Notice: Subject to any disclaimer, the term of this patent is extended or adjusted under 35 U.S.C. 154(b) by 648 days.

(21) Appl. No.: 16/906,232

(22) Filed: Jun. 19, 2020

(65) Prior Publication Data

US 2021/0397634 A1    Dec. 23, 2021

(51) Int. Cl.
 *G06F 16/31*  (2019.01)
 *G06N 5/04*   (2023.01)

(52) U.S. Cl.
 CPC ............ *G06F 16/313* (2019.01); *G06N 5/04* (2013.01)

(58) Field of Classification Search
 CPC .................................................... G06F 16/313
 USPC ........................................................ 707/748
 See application file for complete search history.

(56) References Cited

U.S. PATENT DOCUMENTS

| | | | | |
|---|---|---|---|---|
| 10,127,304 | B1* | 11/2018 | Cohen ................... | G06F 16/287 |
| 10,235,452 | B1* | 3/2019 | Savir ...................... | G06F 16/35 |
| 2007/0005592 | A1 | 1/2007 | Kender et al. | |
| 2007/0156669 | A1 | 7/2007 | Marchisio et al. | |
| 2008/0005651 | A1 | 1/2008 | Grefenstette et al. | |
| 2009/0144248 | A1 | 6/2009 | Treadgold et al. | |
| 2010/0223273 | A1 | 9/2010 | Schneider | |
| 2014/0258047 | A1 | 9/2014 | Livesay et al. | |
| 2016/0179945 | A1* | 6/2016 | Lastra Diaz .......... | G06F 16/284 707/739 |

OTHER PUBLICATIONS

P. Criss, "What to Look for in an RFP Response Tool," RFP 360, https://rfp360.com/rfp-response-tool/, Feb. 25, 2020, 13 pages.
RFPIO, "RFP Software for Efficiency," https://www.rfpio.com/product/, accessed Jun. 19, 2020, 9 pages.
Loopio, "RFP Automation & Response Software," https://www.loopio.com/rfp-automation-software, accessed Jun. 19, 2020, 9 pages.
Cosential, "AEC Customer Relationship Management (CRM) Product Overview," https://www.cosential.com/products/overview/, accessed Jun. 19, 2020, 6 pages.

* cited by examiner

Primary Examiner — Hosain T Alam
Assistant Examiner — Tracy M McGhee
(74) Attorney, Agent, or Firm — Danielson Legal LLC (57) ABSTRACT

An apparatus comprises a processing device configured to select a first data field of a first type that is associated with a second data field of a second type in a document, to determine an embedding of terms of unstructured text data in the first data field and to identify a subset of paired data fields from an unstructured text database based at least in part on metrics characterizing similarity between (i) the embedding of terms in the first data field and (ii) embeddings of terms in data fields of the first type in the paired data fields. The processing device is further configured to determine syntactic differences between the unstructured text data in the first data field and the identified subset of paired data fields, and to provide recommendations for unstructured text data to fill the second data field in the document based on the syntactic differences.

17 Claims, 7 Drawing Sheets

FIG. 1

EXAMPLE 1:

Do you conduct _external_ audits regularly as prescribed by industry best practices and guidance?

Do you conduct _internal_ audits regularly as prescribed by industry best practices and guidance?

301

EXAMPLE 2:

Do non-user IDs require local admin rights on _server machines_? If yes, please provide justification.

Do non-user IDs require local admin rights on _client devices_? If yes, please provide justification

303

EXAMPLE 3:

Fire suppression _systems_?

_Chemical_ fire suppression?

AUTOMATED PROCESSING OF UNSTRUCTURED TEXT DATA IN PAIRED DATA FIELDS OF A DOCUMENT

FIELD

The field relates generally to information processing, and more particularly to techniques for managing data.

BACKGROUND

In many information processing systems, data stored electronically is in an unstructured format, with documents comprising a large portion of unstructured data. Collection and analysis, however, may be limited to highly structured data, as unstructured text data requires special treatment. For example, unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide techniques for automated processing of unstructured text data in paired data fields of a document.

In one embodiment, an apparatus comprises at least one processing device comprising a processor coupled to a memory. The at least one processing device is configured to perform the step of selecting a first data field of a first type from a document, the first data field being associated with a second data field of a second type in the document. The at least one processing device is also configured to perform the steps of determining an embedding of terms of unstructured text data in the first data field and identifying, from an unstructured text database comprising a plurality of paired data fields each comprising a data field of the first type that is associated with a data field of the second type, a subset of the plurality of paired data fields based at least in part on one or more metrics characterizing similarity between (i) the embedding of terms of the unstructured text data in the first data field and (ii) embeddings of terms of unstructured text data in the data fields of the first type in the plurality of paired data fields. The at least one processing device is further configured to perform steps of determining syntactic differences between the unstructured text data in the first data field and the unstructured text data in the data fields of the first type in the identified subset of paired data fields, and providing one or more recommendations for unstructured text data to fill the second data field in the document, the one or more recommendations comprising at least a given portion of unstructured text data in one or more of the data fields of the second type in the identified subset of paired data fields, the given portion of the unstructured text data being determined based at least in part on the syntactic differences between the unstructured text data in the first data field and the unstructured text data in the data fields of the first type in the identified subset of paired data fields.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
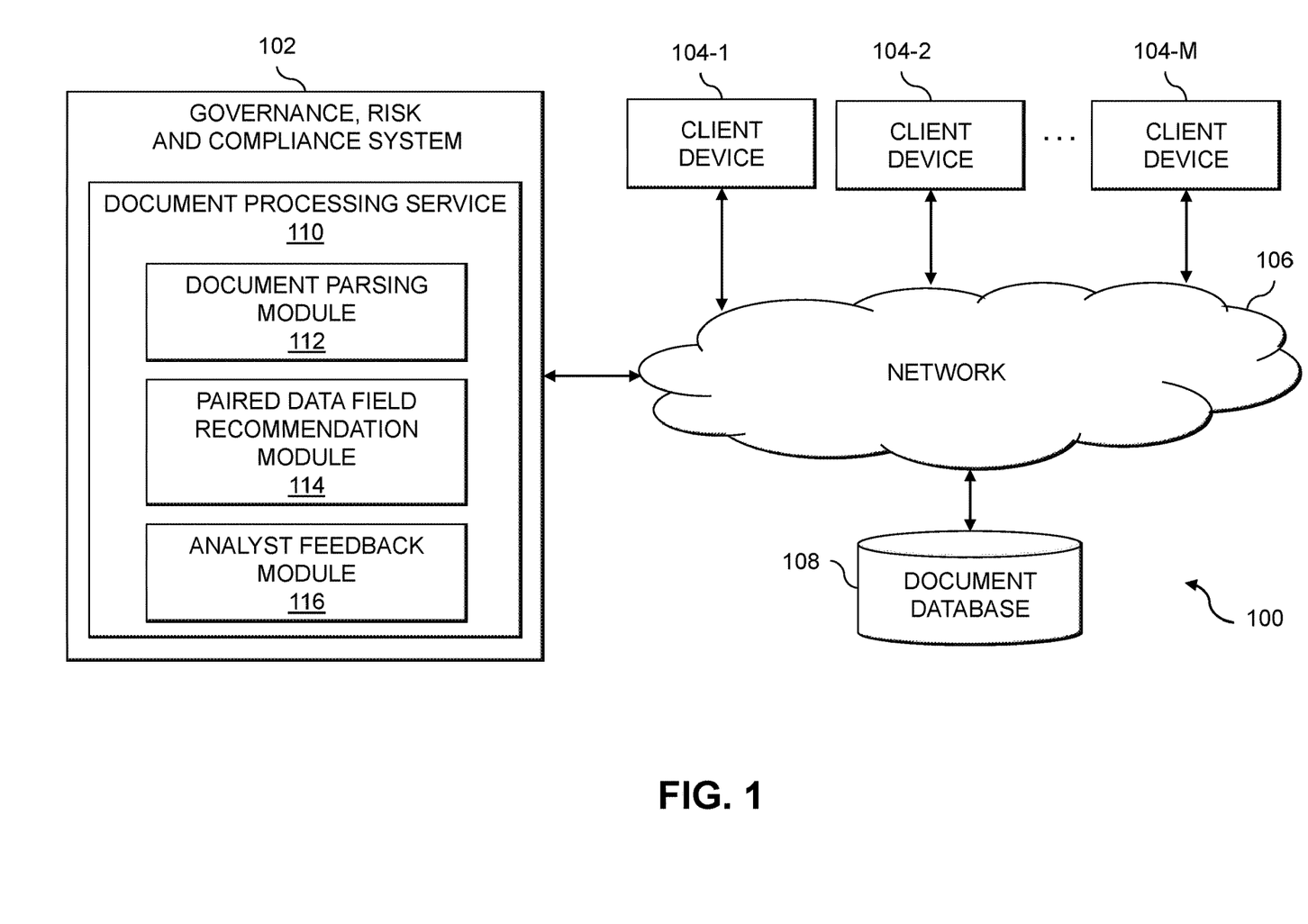
FIG. 1 is a block diagram of an information processing system for automated processing of unstructured text data in paired data fields of a document in an illustrative embodiment of the invention.

FIG. 1 shows an information processing system 100 configured in accordance with an illustrative embodiment. The information processing system 100 is assumed to be built on at least one processing platform and provides functionality for automated processing of unstructured text data in paired data fields of a document. The information processing system 100 includes a governance, risk and compliance (GRC) system 102 and a plurality of client devices 104-1, 104-2, . . . 104-M (collectively client devices 104). The GRC system 102 and client devices 104 are coupled to a network 106. Also coupled to the network 106 is a document database 108, which may store various information relating to documents with paired data fields (e.g., question-answer pairs from previously answered questionnaires).

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The document database 108, as discussed above, is configured to store and record information relating to documents with paired data fields. The paired data fields each comprise a data field of a first type (e.g., a question field) that is associated with a data field of a second type (e.g., an answer field). The paired data fields are assumed to comprise unstructured text data. The document database 108 may include the content (e.g., unstructured text data) of the paired data fields, embeddings for the paired data fields (e.g., the data fields of the first type in the paired data fields), a supervised learning dataset of the paired data fields, etc. The document database 108 in some embodiments is implemented using one or more storage systems or devices associated with the GRC system 102. In some embodiments, one or more of the storage systems utilized to implement the document database 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the GRC system 102, as well as to support communication between the GRC system 102 and other related systems and devices not explicitly shown.

The client devices 104 are configured to access or otherwise utilize a document processing service 110 provided by the GRC system 102. In some embodiments, the client devices 104 submit new documents to the document processing service 110, which is configured to at least partially automate completion of data fields of the submitted documents by recommending unstructured text data to fill in data fields of the submitted documents. For example, in some embodiments the submitted documents comprise questionnaires, and the document processing service 110 is configured to suggest or recommend answers to "new" or unanswered questions of the submitted questionnaires. The suggestions or recommendations may be based at least in part on similarity of unstructured text data in data fields of a first type in the submitted documents and unstructured text data in data fields of the first type in paired data fields from the document database 108.

The GRC system 102, in some cases, is the entity responsible for processing the submitted documents (e.g., the entity responsible for answering submitted questionnaires). For example, the GRC system 102 may be associated with a vendor or other provider of goods or services, such as cloud computing services, to various users. Such users may utilize the client devices 104 to submit questionnaire documents (e.g., in the form of a Request for Proposal (RFP), a Request for Information (RFI), a Request for Quotation (RFQ), etc.) regarding the goods or services offered by the vendor or other provider associated with the GRC system 102. The submitted questionnaire documents from different ones of the client devices 104 may each be at least partially unique but will often have some overlap to other submitted questionnaire documents or previously-completed questionnaire documents. The document processing service 110 can analyze unanswered questions of the submitted questionnaire documents to determine similarity to previously answered questions in the document database 108. The answers to the similar previously answered questions, or portions thereof, may form suggested or recommended answers to the unanswered questions and be used to automatically complete or fill in the unanswered questions.

It should be noted that, in some cases, the document processing service 110 may maintain, in the document database 108, different sets of previously answered question-answer pairs, or more generally paired data fields, that are associated with different domains or knowledge bases. Consider, as an example, a cloud service provider that offers both Infrastructure as a Service (IaaS) and Software as a Service (SaaS) cloud computing services. The document processing service 110 may maintain separate knowledge bases for previously answered question-answer pairs that relate to IaaS and SaaS cloud computing services offered by the cloud service provider. Advantageously, this allows for more fine-tuned suggestions geared toward IaaS versus SaaS cloud computing services.

When submitting documents to the document processing service 110, the associated domain of the submitted documents may be specified so as to narrow suggestions or recommendations based on only paired data fields for the specified domain. If no suggestion or recommendation is available from the specified domain, the document processing service 110 may fall back to or utilize paired data fields from other domains in an attempt to provide recommendations.

In other cases, the GRC system 102 may offer the document processing service 110 to various third-party entities (e.g., entities not associated with or controlling the GRC system 102) responsible for completing documents. For example, different ones of the client devices 104 may be associated with different entities that are responsible for completing questionnaires that they receive. To reduce the time and effort required for completing such questionnaires, the client devices 104 may submit the questionnaires to the document processing service 110 of the GRC system 102 to receive suggested or recommended answers to unanswered questions of the submitted questionnaires. In such cases, the document processing service 110 of the GRC system 102 may maintain, in the document database 108, distinct sets of paired data fields (e.g., previously-answered question-answer pairs) for different ones of the entities utilizing the document processing service 110. Thus, each entity that submits documents to the document processing service 110 will receive recommendations that are based only on paired data fields for documents completed by that entity.

In some embodiments, the document processing service 110 may utilize paired data fields (e.g., previously-answered question-answer pairs) from documents completed by multiple entities when providing recommendations. This may be used as a fallback in the case where no suggestion or recommendation is available or accepted by an analyst (e.g., for a particular data field of a document submitted by a first entity based on paired data fields from documents previously completed by the first entity). In such cases, the document processing service 110 may analyze the paired data fields of documents previously completed by one or more other entities to try to find a recommendation. It should be noted that this is an optional feature, and that in some cases, for privacy or security concerns, entities may specify that the document processing service 110 should only use paired data fields from documents previously completed by a given entity for generating recommendations for completing paired data fields of documents submitted by the given entity to the document processing service 110.

The term "user" herein is intended to be broadly construed so as to encompass numerous arrangements of human, hardware, software or firmware entities, as well as combinations of such entities.

In the present embodiment, alerts or notifications generated by the GRC system 102 (e.g., by the document processing service 110 thereof) are provided over network 106 to client devices 104, or to a system administrator, IT manager, or other authorized personnel (e.g., an analyst or other user responsible for accepting or rejecting recommendations provided by the document processing service 110) via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the GRC system 102 or the document processing service 110. For example, a given host agent may comprise a mobile telephone equipped with a mobile application configured to receive alerts or notifications from the GRC system 102 or the document processing service 110 (e.g., prompts to review and accept or reject recommendations for filling unstructured text data in data fields of a submitted document). The given host agent provides an interface for responding to such various alerts or notifications as described elsewhere herein.

It should be noted that a "host agent" as this term is generally used herein may comprise an automated entity, such as a software entity running on a processing device. Accordingly, a host agent need not be a human entity.

Although shown as an element of the GRC system 102 in the FIG. 1 embodiment, the document processing service 110 in other embodiments can be implemented at least in part externally to the GRC system 102, for example, as a stand-alone server, set of servers or other type of system coupled to the network 106. In some embodiments, the document processing service 110 may be implemented at least in part within one or more of the client devices 104.

The document processing service 110 in the FIG. 1 embodiment is assumed to be implemented using at least one processing device. Each such processing device generally comprises at least one processor and an associated memory and implements one or more functional modules for controlling certain features of the document processing service 110, such as document parsing module 112, paired data field recommendation module 114 and analyst feedback module 116.

The document parsing module 112 is configured to select, from a document submitted to the document processing service 110, a first data field of a first type (e.g., a question field) from the submitted document. The first data field (e.g., the question field) is associated with a second data field (e.g., an answer field) in the submitted document. The document parsing module 112 is also configured to determine an embedding of terms of unstructured text data in the first data field.

The paired data field recommendation module 114 is configured to identify, from an unstructured text database such as document database 108 which comprises a plurality of paired data fields each comprising a data field of the first type that is associated with a data field of the second type, a subset of the plurality of paired data fields. In some embodiments, the paired data fields comprise question-answer pairs. The subset of paired data fields may be identified based at least in part on one or more metrics characterizing similarity between (i) the embedding of terms of the unstructured text data in the first data field and (ii) embeddings of terms of unstructured text data in the data fields of the first type in the plurality of paired data fields.

The paired data field recommendation module 114 is also configured to determine syntactic differences between the unstructured text data in the first data field and the unstructured text data in the data fields of the first type in the identified subset of paired data fields, and to provide one or more recommendations for unstructured text data to fill the second data field in the submitted document. The one or more recommendations comprise at least a given portion of unstructured text data in one or more of the data fields of the second type in the identified subset of paired data fields. The given portion of the unstructured text data is determined based at least in part on the syntactic differences between the unstructured text data in the first data field and the unstructured text data in the data fields of the first type in the identified subset of paired data fields.

In some embodiments, at least one of the recommendations is automatically filled in the second data field in the submitted document. In other embodiments, the one or more recommendations may be presented to an analyst or other user. The analyst feedback module 116 is configured to determine whether the user accepts or rejects the one or more recommendations, and updates the document database 108 based at least in part on whether the user accepts or rejects the one or more recommendations.

It is to be appreciated that the particular arrangement of the GRC system 102, the document processing service 110, the document parsing module 112, the paired data field recommendation module 114 and the analyst feedback module 116 illustrated in the FIG. 1 embodiment is presented by way of example only, and alternative arrangements can be used in other embodiments. As discussed above, for example, the GRC system 102, or one or more portions thereof such as the document processing service 110, may in some embodiments be implemented internal to one or more of the client devices 104. As another example, the functionality associated with the document parsing module 112, the paired data field recommendation module 114 and the analyst feedback module 116 may be combined into one module, or separated across more than three modules with the multiple modules possibly being implemented with multiple distinct processors or processing devices.

At least portions of the document processing service 110 (e.g., the document parsing module 112, the paired data field recommendation module 114 and the analyst feedback module 116) may be implemented at least in part in the form of software that is stored in memory and executed by a processor.

It is to be understood that the particular set of elements shown in FIG. 1 for automated processing of unstructured text data in paired data fields of a document is presented by way of illustrative example only, and in other embodiments additional or alternative elements may be used. Thus, another embodiment may include additional or alternative systems, devices and other network entities, as well as different arrangements of modules and other components.

By way of example, in other embodiments, the document processing service 110 may be implemented external to the GRC system 102, such that the GRC system 102 can be eliminated. The document processing service 110 may also or alternatively be part of or otherwise associated with a system other than the GRC system 102, such as, for example, a security operations center (SOC), a critical incident response center (CIRC), a security analytics system (SAS), a security information and event management (SIEM) system, etc.

The GRC system 102 and the document processing service 110, and other portions of the system 100, may in some embodiments be part of cloud infrastructure as will be described in further detail below. The cloud infrastructure hosting one or both of the GRC system 102 and the document processing service 110 may also host any combination of one or more of the client devices 104 and the document database 108.

The document processing service 110, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and GRC system 102 or components thereof (e.g., the document processing service 110) may be implemented on respective distinct processing platforms, although numerous other arrangements are possible. For example, in some embodiments at least portions of the document processing service 110 and one or more of the client devices 104 are implemented on the same processing platform. A given client device (e.g., 104-1) can therefore be implemented at least in part within at least one processing platform that implements at least a portion of the document processing service 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, the GRC system 102 or portions or components thereof (e.g., the document processing service 110), to reside in different data centers. Numerous other distributed implementations are possible. The document processing service 110 can also be implemented in a distributed manner across multiple data centers.

Additional examples of processing platforms utilized to implement the document processing service 110 in illustrative embodiments will be described in more detail below in conjunction with FIGS. 6 and 7.

It is to be appreciated that these and other features of illustrative embodiments are presented by way of example only and should not be construed as limiting in any way.

Figure 2:
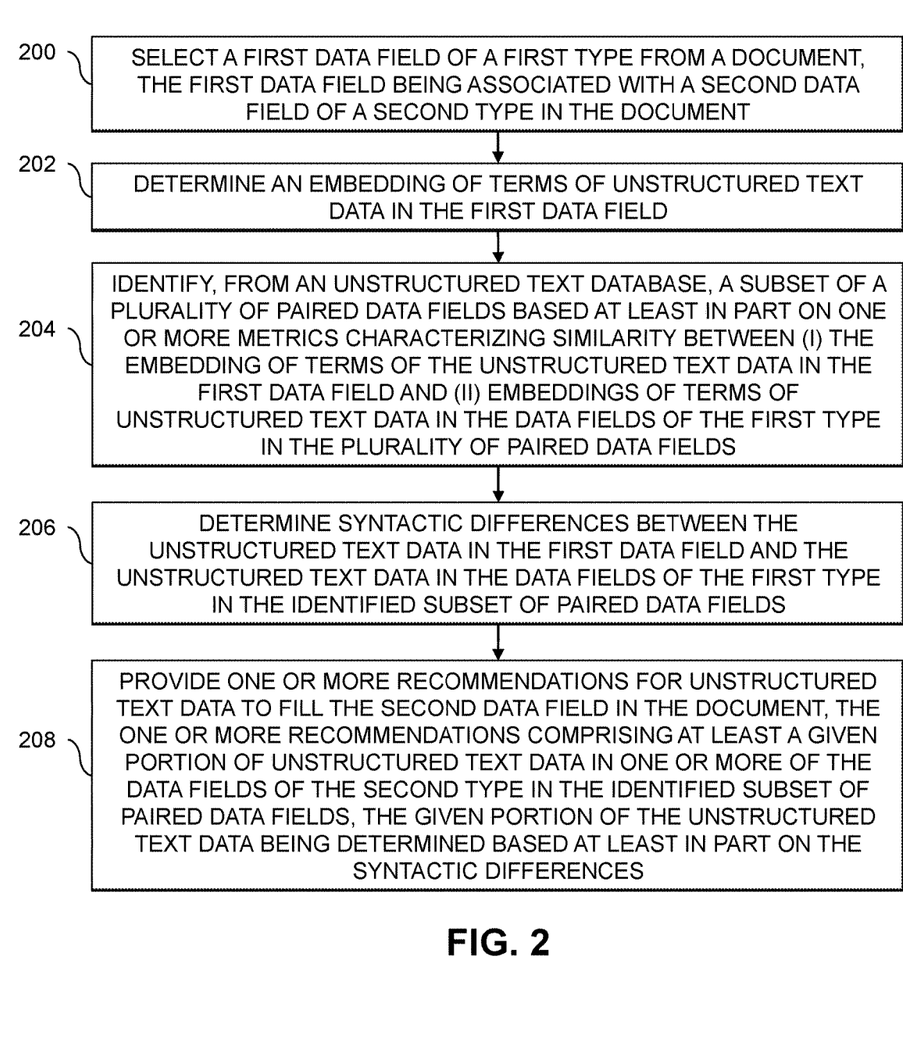
FIG. 2 is a flow diagram of an exemplary process for automated processing of unstructured text data in paired data fields of a document in an illustrative embodiment.

An exemplary process for automated processing of unstructured text data in paired data fields of a document will now be described in more detail with reference to the flow diagram of FIG. 2. It is to be understood that this particular process is only an example, and that additional or alternative processes for automated processing of unstructured text data in paired data fields of a document can be carried out in other embodiments.

In this embodiment, the process includes steps 200 through 208. These steps are assumed to be performed by the document processing service 110 utilizing the document parsing module 112, the paired data field recommendation module 114 and the analyst feedback module 116. The process begins with step 200, selecting a first data field of a first type from a document, the first data field being associated with a second data field of a second type in the document. In step 202, an embedding of terms of unstructured text data in the first data field is determined. The terms of the unstructured text data of the first data field may comprise words, and step 202 may comprise computing a vector space embedding of the terms of the unstructured text data of the first data field. Each term of the unstructured text data of the first data field may be a single word. The vector space embedding may comprise a numerical vector with entries representing weights for respective ones of the terms of the unstructured text data for the first data field. A given one of the weights may comprise one or more of: a term frequency-inverse document frequency weight component; a logarithm of a term frequency weight component; a bag-of-words weight component; and an entropy weight component.

In step 204, a subset of a plurality of paired data fields is identified. The plurality of data fields may be part of an unstructured text database, and each paired data field may comprise a data field of the first type that is associated with a data field of the second type. In some embodiments, the document comprises a questionnaire, the first data field comprises a given question of the questionnaire, the second data field comprises a given answer to the given question of the questionnaire, and the plurality of paired data fields comprise a plurality of previously-answered question-answer pairs from one or more previously-completed questionnaires.

Identifying the subset of paired data fields in step 204 may be based at least in part on one or more metrics characterizing similarity between (i) the embedding of terms of the unstructured text data in the first data field and (ii) embeddings of terms of unstructured text data in the data fields of the first type in the plurality of paired data fields. The similarity metrics may comprise at least one of a cosine similarity metric, a Sørensen-Dice similarity metric, a Jaccard similarity metric, etc. Step 204 may include identifying a designated number of the plurality of paired data fields from the unstructured text database with highest values for the one or more metrics characterizing similarity between (i) the embedding of the terms of the unstructured text data in the first data field and (ii) the embeddings of the terms of the unstructured text data in the data fields of the first type in the plurality of paired data fields.

Syntactic differences between the unstructured text data in the first data field and the unstructured text data in the data fields of the first type in the identified subset of paired data fields are determined in step 206. Step 206 may include computing at least one of an edit distance and a Hamming distance between the unstructured text data in the first data field and the unstructured text data in the data fields of the first type in the identified subset of paired data fields.

In step 208, one or more recommendations for unstructured text data to fill the second data field in the document are provided. The one or more recommendations comprise at least a given portion of unstructured text data in one or more of the data fields of the second type in the identified subset of paired data fields. The given portion of the unstructured text data is determined based at least in part on the syntactic differences determined in step 206. Step 208 may comprise automatically filling at least one of the one or more recommendations in the second data field in the document.

In some embodiments, step 208 comprises presenting the one or more recommendations to a user, determining whether the user accepts or rejects the one or more recommendations, and updating the unstructured text database based at least in part on whether the user accepts or rejects the one or more recommendations. Updating the unstructured text database may comprise, responsive to determining that the user rejects the one or more recommendations: identifying a symmetric set-difference of the terms of the unstructured text data of the first data field and the terms of the unstructured text data in the data fields of the first type in the identified subset of paired data fields; and modifying weights in embeddings of terms belonging to the identified symmetric set-difference relative to weights in embeddings of terms not belonging to the identified symmetric set-difference. Updating the unstructured text database may comprise, responsive to determining that the user accepts at least one of the one or more recommendations, adding the first data field and said at least one recommendation as a new paired data field in the unstructured text database.

Step 208 may include providing to a user the identified subset of paired data fields and a representation of the between the unstructured text data in the first data field and the unstructured text data in the data fields of the first type in the identified subset of paired data fields. Providing the identified subset of paired data fields to the user may comprise: determining, for at least a given one of the identified subset of paired data fields, a first additional paired data field in the unstructured text database that has a data field of the second type with unstructured text data that is semantically similar to unstructured text data in a data field of the second type in the given paired data field; providing the additional paired data field to the user; and responsive to the user accepting at least a portion of the unstructured text data in the data field of the second type in the additional paired data field to fill the second data field, presenting to the user at least a second additional paired data field in the unstructured text database that has a data field of the second type with unstructured text data that is semantically similar to unstructured text data in a data field of the second type in the given paired data field.

Illustrative embodiments will now be described with respect to providing recommendations for filling unstructured text data in questionnaire documents. Questionnaires are a useful tool employed in a variety of contexts. For example, answers to completed questionnaires may provide valuable information to an entity (e.g., a company, business or other enterprise). Significant manual effort, however, is typically required to complete questionnaires and provide such answers. In some cases, an individual or individuals providing answers to questionnaires do so for a large number of questionnaires. Consider, for example, questionnaires provided to a supplier of goods or services. When there is a large number of potential consumers of such goods or services, the supplier may be required to answer numerous, potentially varied, questionnaires. In these and other cases, there may be a significant overlap in the questions asked by disparate questionnaires from various potential consumers. Answering such questionnaires thus becomes a tedious manual task of searching for answers from previously-completed questionnaires or other information sources, and copying and pasting such previous answers or portions thereof into responses to new questionnaires. There is thus a need for techniques for at least partially automating completion of questionnaires.

Illustrative embodiments provide techniques for automating the suggestion or recommendation of potential answers to questionnaires. In some cases, the suggestions or recommendations are automatically entered or filled into responses to questionnaires. In other cases, the suggestions or recommendations may be presented to a user for confirmation before entering or filling in responses to questionnaires. Given a collection of previously answered questions, each of which is assumed to have an associated answer, and an unanswered questionnaire including one or more unanswered questions, some embodiments identify a set of potential answers from the collection of previously answered questions for the one or more unanswered questions of the unanswered questionnaire. Advantageously, such techniques significantly reduce the time and effort required to complete questionnaires. Further, such techniques improve the ability of a responding entity to maintain a single "voice" when answering multiple different questionnaires.

Questionnaires, as noted above, are used for a variety of purposes and in a variety of contexts. In the description below, various features of illustrative embodiments will be described with reference to questionnaires used in a business environment or context, though it should be appreciated that this is just one example context in which questionnaires may be utilized. In a business environment, questionnaires may be used for various purposes, such as to establish a standard knowledge base for a given domain. Consider, as an example, questionnaires utilized by a consumer to evaluate prospective vendors or suppliers of goods and services. When considering the procurement of a product or technology, a company or other consumer may send each of a set of prospective vendors a questionnaire that contains several questions in each of a multitude of categories. Such vendors may be asked to respond to questions related to product features and functionality, as well as their associated financial health, security posture, business practices, potential conflicts, etc. Questionnaires are useful in these and other scenarios, as the information sought is difficult if not impossible to collect in an automated fashion. Moreover, much of the information is qualitative in nature, and many questions require an analyst (e.g., a vendor employee or other user) to manually respond.

To grow business, a vendor may pursue many opportunities simultaneously. This can result in situations where the vendor faces a deluge of questionnaires requiring responses (e.g., from various potential consumers of goods and services offered by the vendor). The analyst of the vendor responsible for responding to the questionnaires will expend significant manual effort and time to complete all of the questionnaires on schedule. Further, such analysts will often answer the same question, or variations of the same question seeking similar information, again and again. This may be due, in part, to disparate customers having significant overlap in the types of information they seek about prospective vendors. Thus, the analyst must recognize that the questions on a current questionnaire they are working on are asking for the same or similar information as previously answered questions. The analyst will thus search for the previous answer and copy the previous answer or a portion thereof to a new questionnaire, making modifications to the response where appropriate. This task can be challenging, as current questions may be worded differently than previously answered questions. Further, the analyst may not remember enough of the wording of suitable previously answered questions, making it more difficult and time consuming to find relevant previously answered questions with a search.

In some cases, each customer submitting a questionnaire to a vendor may have some questions that are unique to their questionnaire. These questions will typically require additional thought, time and manual effort to determine the best way to respond. The challenge is that the analysts responsible for answering questionnaires often experience fatigue from answering all of the "routine" questions before they even have a chance to respond to the unique questions. The term "routine" in this context refers to types of questions that are commonly used for many questionnaires, as distinguished from "unique" questions that are used in only one or a few questionnaires.

It should be noted that the term "routine" in this context does not indicate that a question is a simple or basic question. Consider, as an example, questionnaires related to the delivery of cloud services. An example of a "routine" question in such questionnaires may include questions regarding the way in which the vendor (e.g., a cloud service provider) implements tenant isolation and secure processing of consumer data. This is not an easy or simple question to answer and may require a lengthy and complex discussion of the mechanisms utilized by the cloud service provider. Despite its complexity, such a question may be a "routine" question in the context of questionnaires regarding delivery of cloud services, as many different potential consumers are likely to ask such a question or variation thereof from a cloud service provider.

The techniques described herein address these and other issues by automatically suggesting responses to unanswered questions in new questionnaires. The suggestions are based at least in part on previous questions that have been asked and answered in previously completed questionnaires or in other data sources (e.g., support logs, product data sheets and white papers, etc.). In order to accomplish this goal, some embodiments provide the ability to recognize when a given question on a current questionnaire is asking for the same or similar information as a previously answered question. Once similar previously answered questions are identified, one or more portions of responses to such previously answered questions are provided as suggestions or recommendations for answering the given question.

Illustrative embodiments may be utilized in a variety of contexts, such as in reducing the amount of time spent and effort required for completing RFP and RFI questionnaires. RFP and RFI questionnaires, among other types of questionnaires, can require a significant amount of time and effort from sales and product management teams to complete. Using the techniques described herein, the amount of time and effort expended on RFP, RFI and other types of questionnaires may be significantly reduced, freeing up resources for other tasks. As an example, the RSA Archer® platform or other types of GRC systems may provide a vendor portal that permits customers or other users with an interface to easily send questionnaires and review responses thereto. Such a vendor portal may include various workflows that make it easier for vendors to complete questionnaires, such as using the techniques described herein for automatically suggesting responses to questions on questionnaires they receive.

The techniques described herein provide significant benefits and advantages relative to conventional approaches, including: reducing the amount of time and effort required to complete a questionnaire; ensuring a consistent voice from a company or other entity that is completing questionnaires such as RFPs and RFIs, as consistency will be improved because questions asking for the same or similar information would receive the same or similar answers; reducing human error while filling out questionnaires by leveraging existing answers; and helping analysts or other users to produce compound answers to questions for which exact answers do not exist in a reference set of previously answered questions by combining portions of multiple existing answers into a single answer; etc.

As discussed above, a goal in some embodiments is to reduce the amount of user effort and time required to complete a questionnaire. The techniques described herein accomplish this goal by suggesting or recommending answers to questions in the questionnaire. The suggestions or recommendations are generated from a corpus of previously completed questionnaires. Some embodiments find and present the users with candidate answers to a question by identifying answers to similar questions. So long as similar questions have been answered in the past, the techniques described will attempt to find answers to suggest or recommend. In some embodiments, the solution includes a number of steps or phases, including: computing a vector space embedding for questions and answers in a reference dataset; computing a vector space embedding for a current (e.g., unanswered) question; computing a potential set of (question, answer) pairs that are similar to the current question; computing a representation of the potential set to be given to an analyst; recording the analyst's action; re-weighting terms and updating the reference dataset when appropriate; storing the analyst's action or inaction in a supervised learning dataset used to iteratively improve modeling; and updating the clustering of answers for usage in compound answers.

To compute the vector space embedding for questions and answers in the reference dataset, natural language processing (NLP) preprocessing techniques may be applied to the questions and answers in the reference dataset. Such NLP preprocessing represents the textual content of each question and answer as a numerical vector. Each component of the vector represents the weights of the corresponding term. In some embodiments, each term is a single word (e.g., unigram embedding). While in some embodiments the vector space embeddings assume that terms are single words (e.g., unigram embedding), in other embodiments a sequence of words (e.g., a bi-gram, a tri-gram, etc.) may be used to represent one or more terms.

Various types of embeddings may be used, such as the use of term frequency-inverse document frequency (TF-IDF) where the weight of each term is the number of times it appears in the question and/or answer divided by the total number of questions and/or answers in which it appears. Thus, each question or answer may be represented by a numerical vector, and each component of the vector is associated with a given term (e.g., a word). The value of a component in the vector space embedding may be the term's TF-IDF weight. In addition to TF-IDF, the vector space embedding can use different weights for each component: bag-of-words (questions and answers become binary vectors); term-frequency (TF) or log(TF+1); local, global, and/or normalized entropy weights; etc. One of the challenges in identifying similarity between short segments of text is that synonyms can be used to produce multiple segments of text with the same meaning. A bag-of-words approach may see reduced performance in such cases. For example, a bag-of-words approach may not recognize that "attorney" and "lawyer" are two similar concepts. A latent space representation of words may be used to account for this. For example, Word2Vec embeddings may be used to represent the words in a given segment. The similarity between two segments may be calculated using the word embeddings, where related words should have similar embeddings thus boosting performance.

For the above processing, stop words may first be removed from the text of the questions and answers. This is because, with short segments of text, certain stop words can adversely affect the similarity of the questions because those words represent a higher proportion of the meaning of the text compared to longer sections of text. Thus, some embodiments develop a custom list of stop words. It should be noted that a given language's standard stop word list (e.g., a standard stop word list for the English language) will not necessarily be effective in this context. Questions are typically short, including one or two sentences. Further, a single word could change the meaning of a question. For instance, words such as "not", "all" and "any" exist in most standard lists of English stop words. The addition of such words, however, could change the meaning of questions or answers, thus changing which questions and answers in the corpus should be identified as similar. The above-described processing is used not only for the reference dataset, but also for the current question for which similar previously answered questions are sought.

To identify the set of potential (question, answer) pairs, a question similarity ranking is utilized in some embodiments. A similarity score, such as a cosine similarity, may be computed between the current question and all or some designated threshold number of previously answered questions found in the corpus of the reference dataset. It should be appreciated that various other types of similarity metrics may be utilized, including the use of Sørensen-Dice or Jaccard similarity metrics. In some embodiments, the numeric values computed by the similarity metrics may be normalized. For example, the numeric values computed by similarity metrics may be normalized by the number of terms in the sentence (e.g., in a question).

Such similarity scores, in some embodiments, may be computed for each unanswered question in a current questionnaire or set of questionnaires to be completed. For each unanswered question in a given questionnaire, the previously answered questions in the corpus of the reference dataset are ranked (e.g., from highest similarity score to lowest). From this ranking, a set of potential (question, answer) pairs are taken and used as suggestions for a current unanswered question. The size of the set of potential (question, answer) pairs is chosen as described below.

Each unanswered question in a new or current questionnaire may be paired with the N most similar questions in the corpus of the reference dataset, so long as the similarity values exceed some specified threshold. Due to the lack of available data, it may be difficult to select an appropriate value for the threshold similarity. Thus, some embodiments may use a top 1, 2, 3, 4 or 5 questions (or, more generally a top N questions) with the highest similarity score (e.g., highest cosine similarity score) without use of a threshold similarity value. The answers for each of the paired questions in the corpus will be suggested as possible answers to the unanswered question in the current questionnaire. The set of paired questions and answers is referred to as the potential set of (question, answer) pairs.

More formally, let Q be the reference dataset, or the set of questions that have been answered in the past. Let $a_j$ be the answer provided to $q_j \in Q$. Let Q' be the set of questions on a new questionnaire. Let $t \in [0,1]$ be the threshold for question similarity, and let N ($N \leq 5$) be the number of responses to return for each $q_i' \in Q'$. While various embodiments are described with respect to the use of values for $N \leq 5$, it should be appreciated that this is not a requirement and that other larger or smaller values for N may be used as desired for a particular implementation.

For each $q_i' \in Q'$ and each $q_j \in Q$, compute $S(q_i', q_j)$, where S(a, b) is the similarity between a and b. For each $q_i'$, identify the top N entries in Q with the highest similarity values, and define them as $Q_{N,q_i'} = \{q_1, q_2, \ldots, q_N\}$. These are sorted in decreasing order of similarity value, so that $q_1$ has the highest similarity value, and $q_N$ has the Nth highest similarity value. The set of potential (question, answer) pairs for each question $q_i'$ in the questionnaire is $A_{N,q_i'} = \{(q_1, a_1), (q_2, a_2), \ldots, (q_N, a_N)\}$.

Initially, it may be difficult to ascertain an appropriate threshold value for the similarity between an unanswered question and any question in the reference dataset. However, over time a threshold value $$t = \min_{q_j \in Q} S(q_i', q_j) - \alpha$$

may be determined, such that the answer of $q_j$ was chosen by an analyst as a relevant answer to $q_i'$. The value a is included to ensure that a high enough recall is maintained. The threshold value t may be used to further reduce the set of potential (question, answer) pairs for each unanswered question in the questionnaire by requiring $S(q_i',q_j) \geq t$. When presenting a set of potential (question, answer) pairs to an analyst, they may be ordered based on similarity score of the corresponding questions (e.g., from highest to lowest).

To help the analyst decide whether an answer is relevant or not, a syntactic difference between the question being asked and each question in the set of potential (question, answer) pairs may be computed to highlight the differences therebetween. Examples of possible methods for computing syntactic difference include, but are not limited to, edit distance and Hamming distance. The edit distance may be configured as a Levenshtein-like string-edit distance, using words as characters. Such a word-as-character string-edit distance is also referred to herein as a question-edit distance. It should be noted that computing Hamming distance is a fairly efficient computational operation (e.g., it is linear time in the size of the questions). In addition, once the top N ($N \leq 5$) questions are identified, the syntactic difference computation may be restricted just between the question being asked and the questions in the corresponding potential set of (question, answer) pairs.

Figure 3:
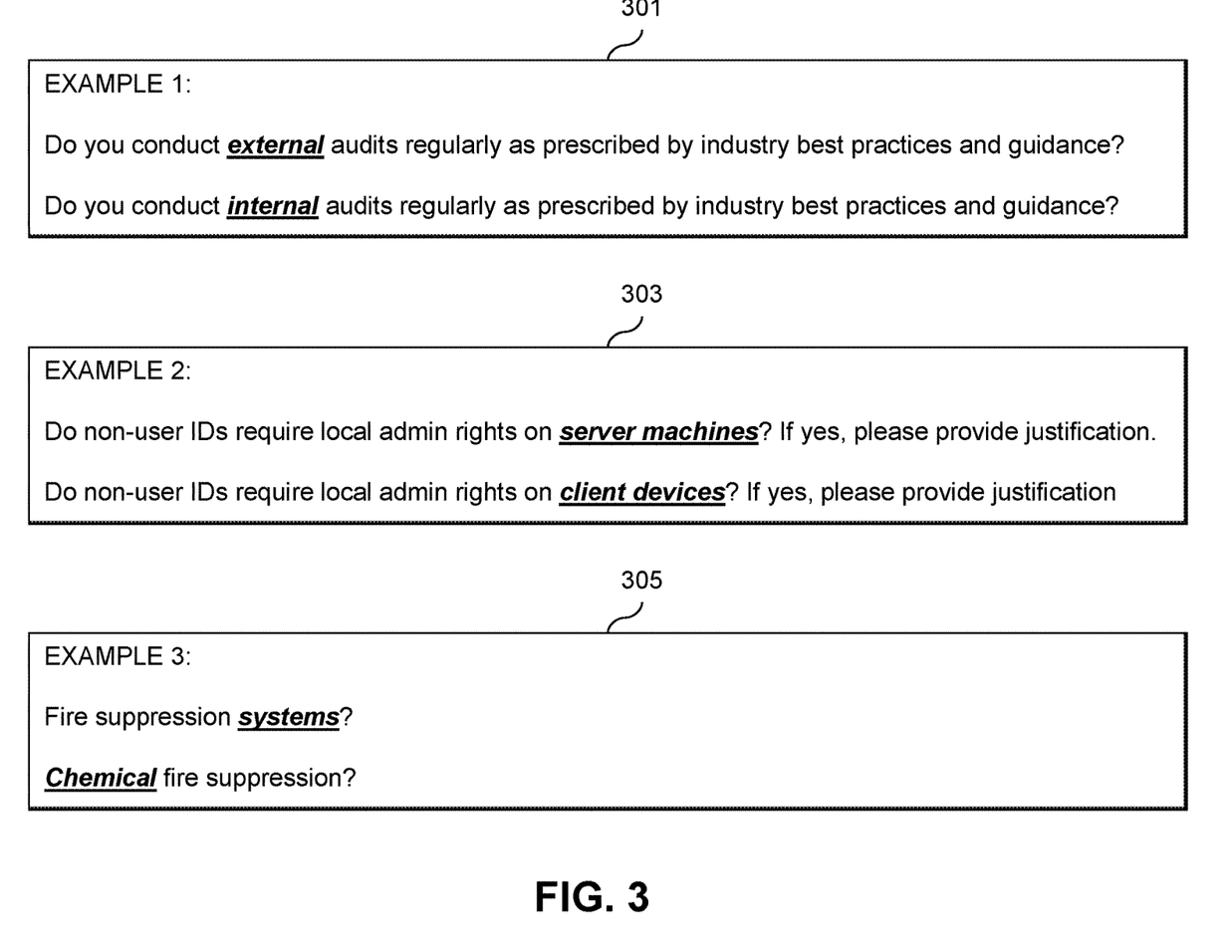
FIG. 3 shows examples of question pairs in an illustrative embodiment.

The syntactic difference may be underlined, bolded and/or italicized between strings to visually aid the analyst in quickly determining if an answer is relevant or not. FIG. 3 shows example pairs 301, 303 and 305 of questions, with syntactic differences highlighted with underlined, bold and italicized text. By identifying the words and phrases that separate the question being asked from the proposed set of questions, an analyst can quickly determine if the answers of the proposed questions are relevant to the questions being asked.

The analyst can also use the emphasis of the difference between questions and answer to produce what is referred to herein as a compound answer. Producing a compound answer results from the case when no question in the reference dataset contains exactly the needed information, but where at least a portion of the needed information can be found by combining answers to multiple questions in the reference dataset. To illustrate this, consider "Do you conduct audits regularly as prescribed by industry best practices and guidance?" as an unanswered question for which an answer is sought. If the reference dataset contains one or both of the questions from example 301 in FIG. 3, the analyst can combine the answers from such questions in the reference dataset to produce the compound answer. It should be appreciated that the analyst may also augment the answer to the question with additional information, both in cases where compound answers are used and otherwise. Again, the techniques described may significantly speed up the analyst's ability to identify, use and augment potential answers. If the analyst were forced to spend significant time discerning the relevance of suggested answers, the benefits of providing the suggested set of potential (question, answer) pairs is reduced.

As discussed above, a similarity measure (e.g., cosine similarity) is used to identify the set of potential (question, answer) pairs with potentially relevant and useful answers for a current question, where the current question is assumed to be unanswered or has an incomplete or low-quality answer. Ideally, the questions in the set of potential (question, answer) pairs are semantically equivalent to the current question. In many cases, the algebraic ranking will be a reasonable approximation of the semantic similarity of the questions. Consider, however, examples 301, 303 and 305 in FIG. 3. In the examples 301, 303 and 305, the similarity between the question pairs is reasonably large (e.g., above 0.6), yet the questions in each are not semantically close and thus reusing those answers will be incorrect.

The similarity measure may be used to increase the weight of the words found in the current question and the question(s) from the reference dataset in such cases. Weights should be modified whenever the similarity score is high, yet the analyst has determined that the questions are dissimilar. The weights of the words that belong to the symmetric set-difference (e.g., the union excluding the intersection) of the two questions are therefore increased. That is to say, the weights of words that are found in one but not both of the questions are increased. As such, the weights of the words "internal" and "external" in example 301 may be increased.

There are several methods that may be used for increasing term (e.g., word) weighting. In some embodiments, additive weight boosting or multiplicative weight boosting is used. In some implementations of such approaches, the weights of the terms in the intersection will remain unchanged. A more aggressive re-weighting may consider reducing the weights of the terms that belong to the intersection. This can be done together with, or in place of, boosting the weights of terms in the symmetric set-difference of the terms in the two questions considered.

To iteratively improve the performance, some embodiments capture feedback from the analysts. Such feedback may take the form of newly created (question, answer) pairs to be added to the reference dataset. This increases the size of the dataset, thereby providing more possible matches. As the reference dataset is updated, term weights should be recomputed. The new term weights will better represent the underlying data. However, term weight adjustments may be maintained in some embodiments to capture insight from analysts on term importance. Discarding such information could hamper performance in some cases. The modifications to the term weights can be captured as weight offsets, so that they may be reapplied after the weights have been recomputed. Analyst actions and inactions can also be stored in a supervised learning dataset. This enables the construction of more robust models that can be trained against ground truth. The results may be stored as a 5-tuple of (new question, new answer, previous question, previous answer, same_question), where same_question identifies whether the questions are asking for the same information.

Answers may be clustered by providing, for each answer, a set of K nearest neighbors with respect to the similarity metrics utilized (e.g., cosine similarity). For each question in the set of potential (question, answer) pairs, the top scoring most similar answer may be identified. The associated cluster may be helpful for analysts to identify partial answers to compound questions not present in the reference dataset. If successful, the reference dataset Q may be updated. Let $A_{N,q_{i'}} = \{(q_1, a_1), (q_2, a_2), \ldots, (q_N, a_N)\}$ be the set of potential (question, answer) pairs for a question in a questionnaire. For each answer $a_j$, another answer $\hat{a}_j$ is identified such that $Sim(a_j, \hat{a}_j)$ is maximized and an augmented set of potential (question, answer) pairs is offered: $\widehat{A_{N,q_{i'}}} = \{(q_1, a_1, \widehat{q_1, a_1}), (q_2, a_2, \widehat{q_2, a_2}), \ldots, (q_N, a_N, \widehat{q_N, a_N})\}$. In some embodiments, only the nearest neighbor (K=1) is initially presented to the analyst as a suggested answer. If the analyst finds a particular nearest neighbor suggested answer (e.g., $\widehat{q_1, a_1}$) relevant, the remaining K-1 neighbors of $a_1$ may be retrieved and presented to the analyst. In addition to the closest or most similar answer (e.g., $\widehat{a_N}$), the corresponding question (e.g., $\widehat{a_N}$) may also be computed. A representation of the questions and answers may also be computed as described above to aid analysts in making a quick decision as to whether suggested answers are relevant or not.

Experimental results on a sample dataset of RFPs (e.g., obtained from an RSA Archer® GRC system), will now be described. RFPs may be sent in the form of Excel workbooks. RFPs and other types of questionnaires are not necessarily presented in a standard format. Typically, the question column is found before (e.g., to the left of) the associated answer column, but there is no requirement for this to be the case. Further, there is generally no standardization around which column number represents the question column and which column number represents the answer column.

In addition to lacking standardized formats regarding column numbers for questions and answers, the names of columns used for questions and answers may vary. Names for question columns may include: question, requirements, provide the following, criteria, etc. Names for answer columns may include: vendor response, vendor comments, answer, supplier response, supplier comments, etc. It should be appreciated, however, that these are just examples of names for question and answer columns, and that questionnaires may use various other names including combinations of the above example names. Some workbooks or other questionnaire formats may also utilize multiple columns for questions and/or answers. For example, a workbook may include multiple answer columns such as a first answer column for yes/no answers and a second answer column for comments. Because of these and other challenges, it is difficult to write a single automated parser for all RFPs or other questionnaires. As a result, various parsers may be utilized and possibly customized for use with different types of customers or questionnaire sources.

In the sample dataset, an RFP parser was used to collect a large number of questions—30,883 questions extracted from 226 files. The RFP parser used performed only rudimentary error checking, and thus the extracted questions were validated before being included in the reference corpus. Various types of question validation conditions may be utilized, including: checking that a question contains a question mark; checking that a question begins with specific text such as describe, please describe, provide, explain; etc. Following question validation, approximately 72% of the extracted questions (e.g., 22,212 of the 30,883 extracted questions) were validated.

Figure 4:
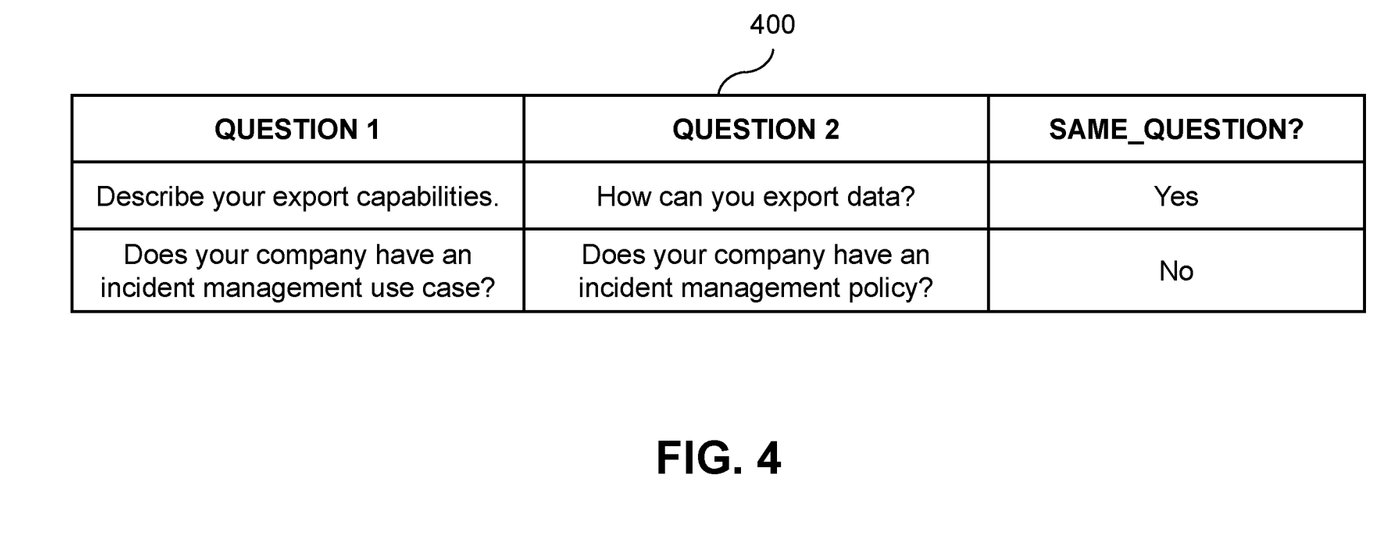
FIG. 4 shows a table format for representing question pairs in an illustrative embodiment.

In order to compare performance between different approaches, some embodiments utilize a supervised learning dataset. The format shown in table 400 of FIG. 4 may be utilized for the information in the supervised learning dataset, with first and second columns for first and second questions in a question pair, and a third column for the same_question value. Questions were paired and manually annotated based on whether they were paraphrases of one another or not. As a result, 1137 question pairs were annotated from the validated questions. These pairs were divided into a training set of size 761 and a test set of size 376. Given the time-consuming nature of this task, a small subset of the total question population was included in the supervised learning dataset. In the sample dataset, it should be noted that for roughly 60% of the questions there was an exact match with another question in the dataset. Although this is very useful in production, such exact matches were not included in the evaluation of models described below. Excluding exact matches from the supervised learning dataset forces the models to perform against a more challenging problem.

The supervised learning dataset was used to compare different NLP models. A machine learning model may also be trained on the supervised learning dataset to recognize, for a given question pair, whether it should recommend the answer. The NLP models were compared without the use of machine learning in the experiment, but some embodiments may utilize machine learning models and may involve evaluating and tuning such machine learning models to improve performance on this problem. The first model that was evaluated was a random model. For a given question pair, the random model randomly selects between predicting the questions are the same or not. The random model was implemented as a baseline. The various other models used should and do outperform the random model. Additional models that were tested include a TF-IDF model, a TF-IDF model with a custom stop word list (TF-IDF-SW), and a Log Entropy model with the custom stop word list (LE-SW). For each of the models, other than the random model, the threshold t was set to 0.6. The questions from the training set were used to create the vector space embedding for the model.

Figure 5:
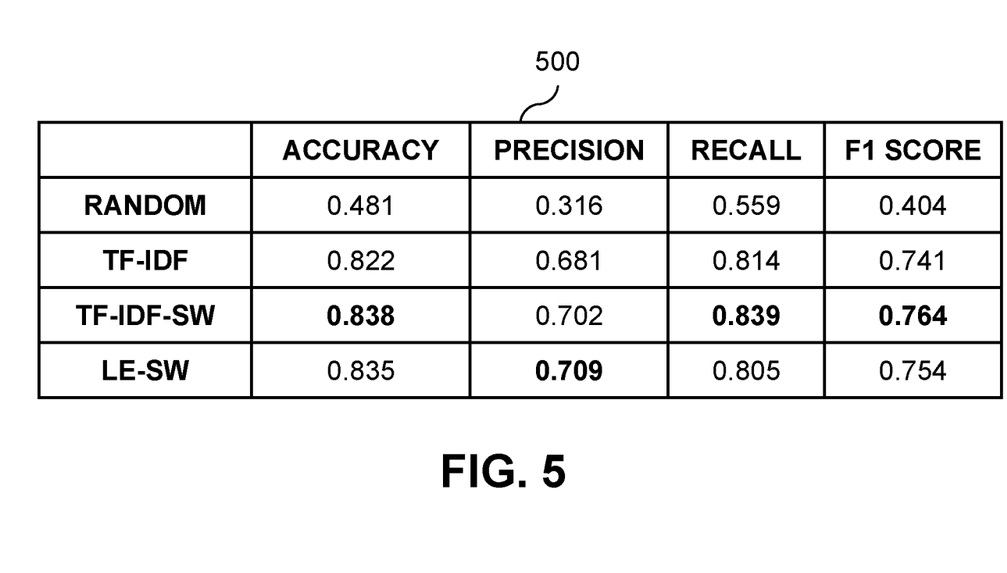
FIG. 5 shows a table comparing performance of different language processing models in an illustrative embodiment.

The results are shown in the table 500 of FIG. 5. The table 500 includes columns for accuracy, precision, recall and F1 score values for the random, TF-IDF, TF-IDF-SW and LE-SW models. As shown in bold, the TF-IDF-SW model produces the best accuracy and recall, but the LE-SW model has slightly higher precision. Some embodiments may thus select use of the TF-IDF-SW model because the modest worsening of precision performance may be viewed as worth the improvement in recall. In other embodiments, however, higher precision may be desired and the LE-SW model may be utilized. It should be appreciated, however, that the particular model selected may vary. For example, with other reference datasets the performance of the TF-IDF, TF-IDF-SW and LE-SW models may vary such that the choice of model may be different. It should be further appreciated that the TF-IDF, TF-IDF-SW and LE-SW models are presented by way of example only, and that in other embodiments various other types of models may be evaluated and possibly utilized.

Some embodiments may also utilize an ensemble of NLP models to improve performance. For example, the results of using the TF-IDF-SW model may be combined with the result of one or more additional NLP models such as the LE-SW model. The results from the different models in the ensemble may be averaged in some cases. The results from the different models may also or alternatively be considered as features input to a machine learning model.

The use of a supervised learning dataset provides various advantages. For example, metrics such as accuracy, precision, recall and F1 score can be readily computed due to the existence of ground truth. That being said, the sample dataset included only 376 test samples for the ground truth which is relatively small. However, for a more complete evaluation the TF-IDF-SW model was utilized to qualitatively assess performance on actual RFPs. Looking through the responses, the TF-IDF-SW model appears to produce reasonable and useful results. It should be noted that as completing a questionnaire is a tedious and slow manual task, models that provide the right suggested answers for even a fraction of the questions (e.g., 25% of the questions) can still save the analyst responsible for completing the questionnaire a significant amount of time. Further, the model used may be improved over time through analyst feedback as described elsewhere herein.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated processing of unstructured text data in paired data fields of a document will now be described in greater detail with reference to FIGS. 6 and 7. Although described in the context of system 100, these platforms may also be used to implement at least portions of other information processing systems in other embodiments.

Figure 6:
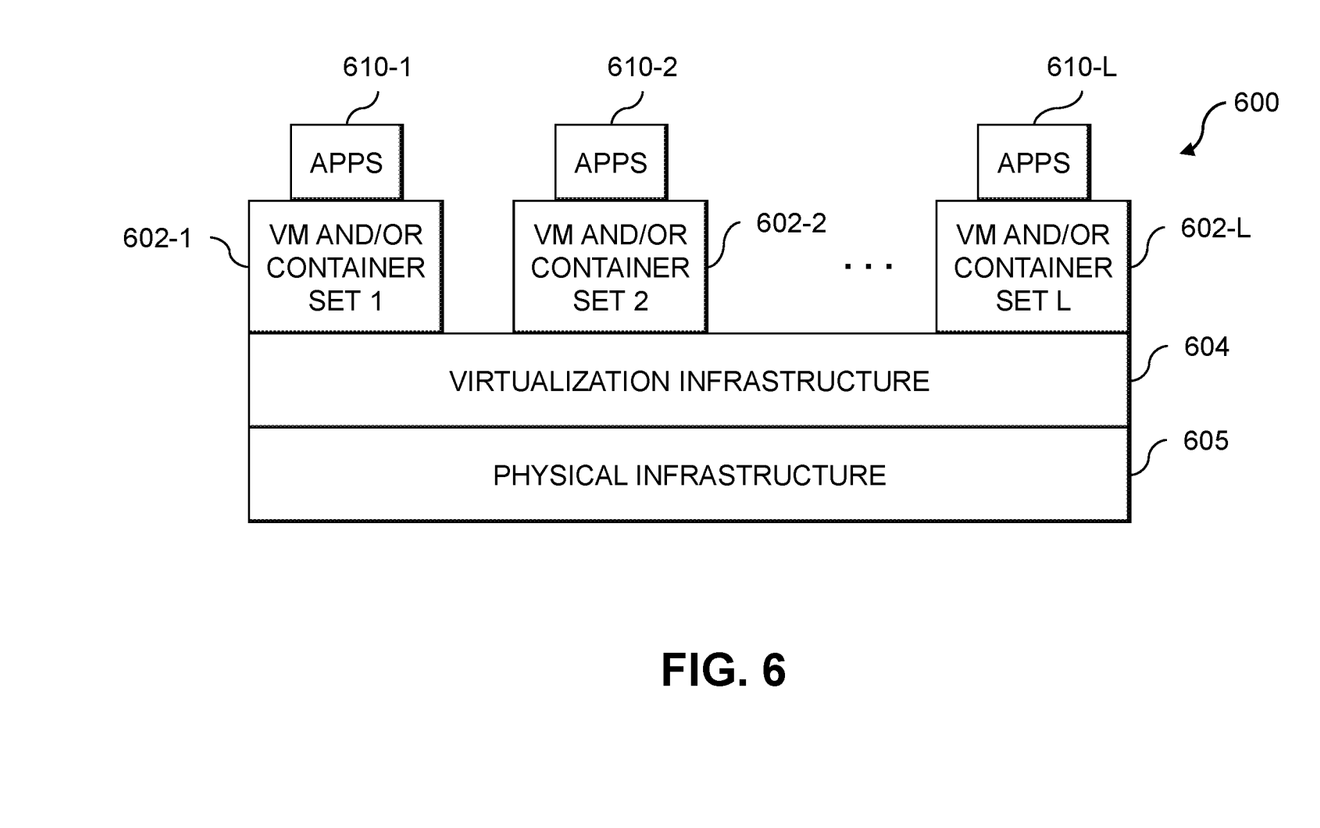
FIGS. 6 and 7 show examples of processing platforms that may be utilized to implement at least a portion of an information processing system in illustrative embodiments.
Figure 7:
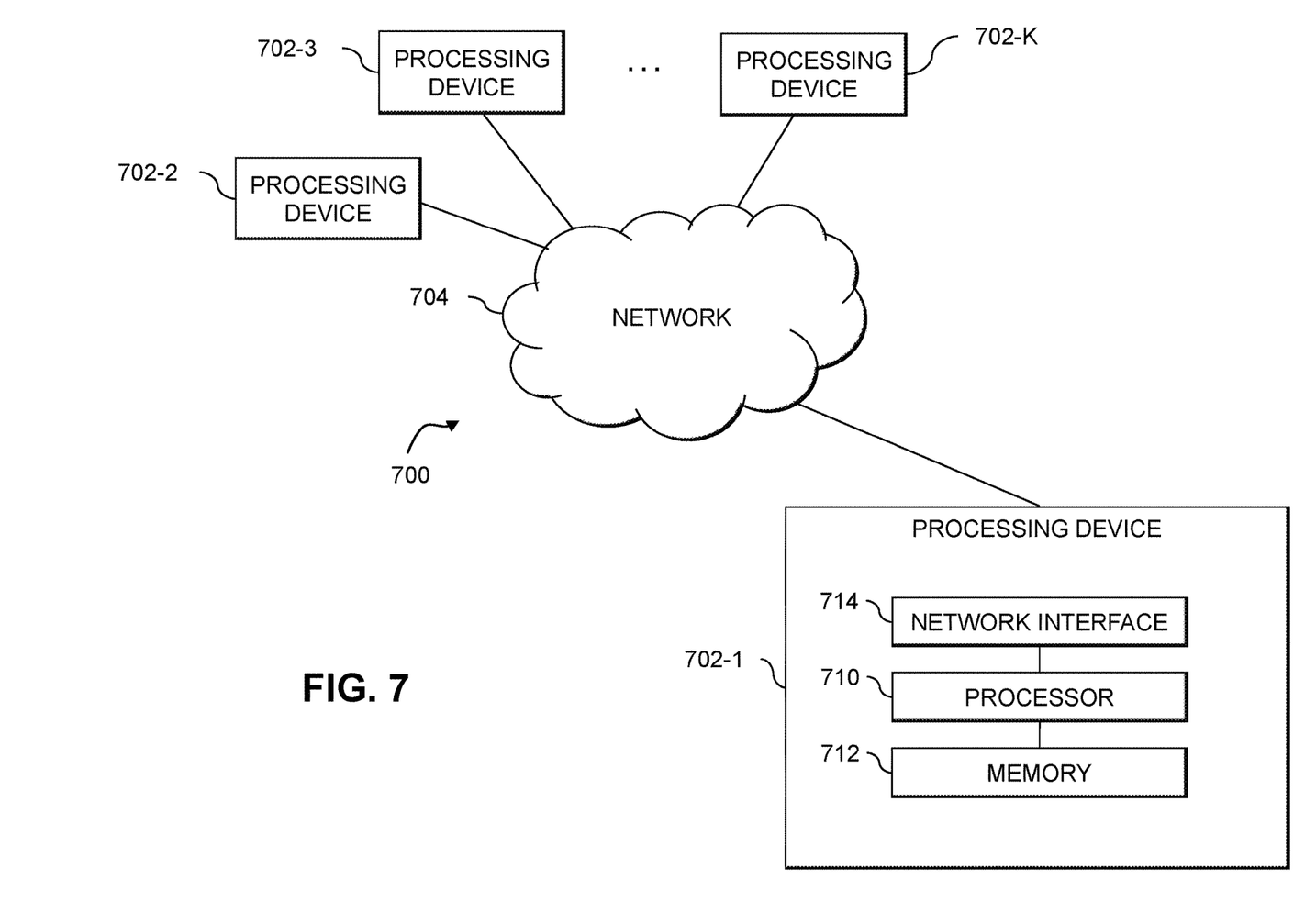

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated processing of unstructured text data in paired data fields of a document as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, documents, questionnaires, embeddings, similarity metrics, distance metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
selecting a first data field of a first type from a document, the first data field corresponding to a question and being associated with a second data field of a second type in the document, the second data field corresponding to an answer to the question;

determining an embedding of terms of unstructured text data in the first data field;

identifying, from an unstructured text database comprising a plurality of paired data fields each comprising a data field of the first type that is associated with a data field of the second type, a subset of the plurality of paired data fields based at least in part on a one or more metrics characterizing similarity between (i) the embedding of terms of the unstructured text data in the first data field and (ii) embeddings of terms of unstructured text data in the data fields of the first type in the plurality of paired data fields;

determining syntactic differences between the unstructured text data in the first data field of the document and the unstructured text data in the data fields of the first type in the identified subset of paired data fields to determine whether the unstructured text data fields of the second type in the identified subset are relevant to the question;

providing one or more recommendations for unstructured text data to fill the second data field in the document, the one or more recommendations comprising at least a given portion of unstructured text data in one or more of the data fields of the second type in the identified subset of paired data fields, the given portion of the unstructured text data being determined based at least in part on the syntactic differences between the unstructured text data in the first data field and the unstructured text data in the data fields of the first type in the identified subset of paired data fields;

receiving feedback regarding the one or more provided recommendations; and updating, based on the received feedback, a weighting of at least one unstructured term in a supervised learning dataset iteratively improve recommendations for unstructured data.

2. The apparatus of claim 1 wherein the document comprises a questionnaire, and the plurality of paired data fields comprise a plurality of previously-answered question-answer pairs from one or more previously-completed questionnaires.

3. The apparatus of claim 1 wherein the terms of the unstructured text data of the first data field comprise words, and wherein determining the embedding of the terms of the unstructured text data of the first data field comprises computing a vector space embedding of the terms of the unstructured text data of the first data field.

4. The apparatus of claim 3 wherein each term of the unstructured text data of the first data field is a single word.

5. The apparatus of claim 3 wherein the vector space embedding comprises a numerical vector with entries representing weights for respective ones of the terms of the unstructured text data for the first data field, a given one of the weights comprising one or more of:

a term frequency-inverse document frequency weight component;

a logarithm of a term frequency weight component;

a bag-of-words weight component; and an entropy weight component.

6. The apparatus of claim 1 wherein the one or more metrics characterizing similarity between (i) the embedding of the terms of the unstructured text data in the first data field and (ii) the embeddings of the terms of the unstructured text data in the data fields of the first type in the plurality of paired data fields comprise at least one of:

a cosine similarity metric;

a Sørensen-Dice similarity metric; and a Jaccard similarity metric.

7. The apparatus of claim 1 wherein identifying the subset of paired data fields comprises identifying a designated number of the plurality of paired data fields from the unstructured text database with highest values for the one or more metrics characterizing similarity between (i) the embedding of the terms of the unstructured text data in the first data field and (ii) the embeddings of the terms of the unstructured text data in the data fields of the first type in the plurality of paired data fields.

8. The apparatus of claim 1 wherein determining the syntactic differences comprises computing at least one of an edit distance and a Hamming distance between the unstructured text data in the first data field and the unstructured text data in the data fields of the first type in the identified subset of paired data fields.

9. The apparatus of claim 1 wherein providing the one or more recommendations for unstructured text data to fill the second data field in the document comprises automatically filling at least one of the one or more recommendations in the second data field in the document.

10. The apparatus of claim 1, the at least one processing device being further configured to perform steps of updating the supervised learning dataset by:

identifying a symmetric set-difference of the terms of the unstructured text data of the first data field and the terms of the unstructured text data in the data fields of the first type in the identified subset of paired data fields; and updating a weighting of at least one unstructured term based on the received feedback includes modifying weights in embeddings of terms belonging to the identified symmetric set-difference relative to weights in embeddings of terms not belonging to the identified symmetric set-difference.

11. The apparatus of claim 1, the at least one processing device being further configured to perform the step of updating the supervised learning dataset by, responsive to determining that a user accepts at least one of the one or more recommendations, adding the first data field and said at least one recommendation as a new paired data field in the unstructured text database.

12. The apparatus of claim 1 wherein providing the one or more recommendations for unstructured text data to fill the second data field in the document comprises providing to a user the identified subset of paired data fields and a representation of the between the unstructured text data in the first data field and the unstructured text data in the data fields of the first type in the identified subset of paired data fields.

13. The apparatus of claim 12 wherein providing the identified subset of paired data fields to the user comprises:

determining, for at least a given one of the identified subset of paired data fields, a first additional paired data field in the unstructured text database that has a data field of the second type with unstructured text data that is semantically similar to unstructured text data in a data field of the second type in the given paired data field;

providing the additional paired data field to the user; and responsive to the user accepting at least a portion of the unstructured text data in the data field of the second type in the additional paired data field to fill the second data field, presenting to the user at least a second additional paired data field in the unstructured text database that has a data field of the second type with unstructured text data that is semantically similar to unstructured text data in a data field of the second type in the given paired data field.

14. A computer program product comprising a non-transitory processor-readable storage medium having stored therein program code of one or more software programs, wherein the program code when executed by at least one processing device causes the at least one processing device to perform steps of:
selecting a first data field of a first type from a document, the first data field corresponding to a question and being associated with a second data field of a second type in the document, the second data field corresponding to an answer to the question;
determining an embedding of terms of unstructured text data in the first data field;
identifying, from an unstructured text database comprising a plurality of paired data fields each comprising a data field of the first type that is associated with a data field of the second type, a subset of the plurality of paired data fields based at least in part on one or more metrics characterizing similarity between (i) the embedding of terms of the unstructured text data in the first data field and (ii) embeddings of terms of unstructured text data in the data fields of the first type in the plurality of paired data fields;
determining syntactic differences between the unstructured text data in the first data field of the document and the unstructured text data in the data fields of the first type in the identified subset of paired data fields to determine whether the unstructured text data fields of the second type in the identified subset are relevant to the question;
providing one or more recommendations for unstructured text data to fill the second data field in the document, the one or more recommendations comprising at least a given portion of unstructured text data in one or more of the data fields of the second type in the identified subset of paired data fields, the given portion of the unstructured text data being determined based at least in part on the syntactic differences between the unstructured text data in the first data field and the unstructured text data in the data fields of the first type in the identified subset of paired data fields;
receiving feedback regarding the one or more provided recommendations; and
updating, based on the received feedback, a weighting of at least one unstructured term in a supervised learning dataset to iteratively improve recommendations for unstructured data.

15. The computer program product of claim 14 wherein providing the one or more recommendations for unstructured text data to fill the second data field in the document comprises automatically filling at least one of the one or more recommendations in the second data field in the document.

16. A method comprising:
selecting a first data field of a first type from a document, the first data field corresponding to a question and being associated with a second data field of a second type in the document, the second data field corresponding to an answer to the question;
determining an embedding of terms of unstructured text data in the first data field;
identifying, from an unstructured text database comprising a plurality of paired data fields each comprising a data field of the first type that is associated with a data field of the second type, a subset of the plurality of paired data fields based at least in part on one or more metrics characterizing similarity between (i) the embedding of terms of the unstructured text data in the first data field and (ii) embeddings of terms of unstructured text data in the data fields of the first type in the plurality of paired data fields;
determining syntactic differences between the unstructured text data in the first data field of the document and the unstructured text data in the data fields of the first type in the identified subset of paired data fields to determine whether the unstructured text data fields of the second type in the identified subset are relevant to the question;
providing one or more recommendations for unstructured text data to fill the second data field in the document, the one or more recommendations comprising at least a given portion of unstructured text data in one or more of the data fields of the second type in the identified subset of paired data fields, the given portion of the unstructured text data being determined based at least in part on the syntactic differences between the unstructured text data in the first data field and the unstructured text data in the data fields of the first type in the identified subset of paired data fields;
receiving feedback regarding the one or more provided recommendations; and
updating, based on the received feedback, a weighting of at least one unstructured term in a supervised learning dataset to iteratively improve recommendations for unstructured data;
wherein the method is performed by at least one processing device comprising a processor coupled to a memory.

17. The method of claim 16 wherein providing the one or more recommendations for unstructured text data to fill the second data field in the document comprises automatically filling at least one of the one or more recommendations in the second data field in the document.

* * * * *